Oct. 19, 1937.  L. B. NEIGHBOUR  2,096,057
MANURE SPREADER
Filed Nov. 20, 1935
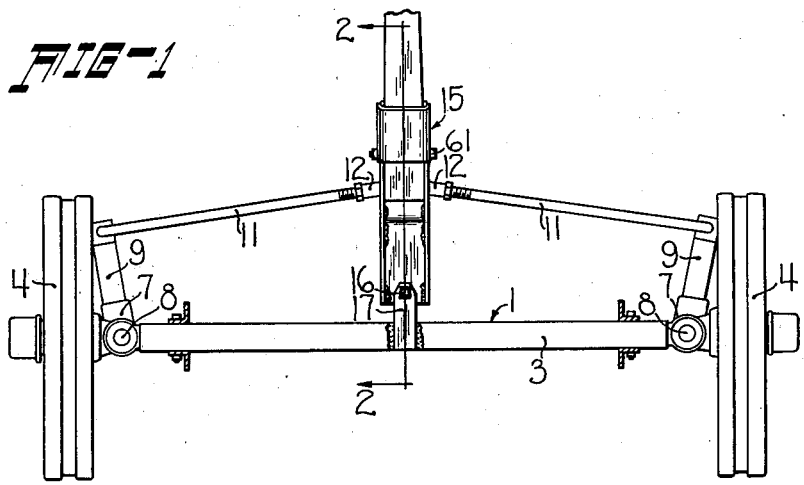
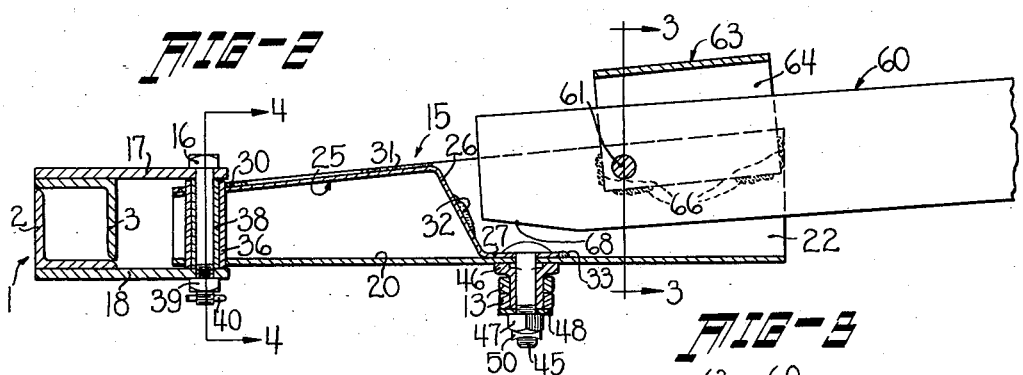
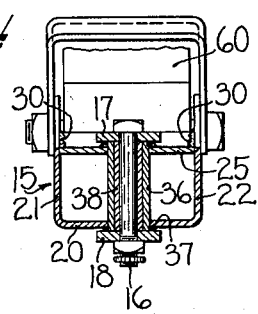
INVENTOR
Leonard B. Neighbour
BY
Brown, Jackson, Boettcher & Dienner
ATTORNEYS.

Patented Oct. 19, 1937

2,096,057

UNITED STATES PATENT OFFICE 2,096,057

MANURE SPREADER

Leonard B. Neighbour, Moline, Ill., assignor to Deere & Company, Moline, Ill., a corporation of Illinois Application November 20, 1935, Serial No. 50,677

18 Claims. (Cl. 280—103)

The present invention relates generally to manure spreaders and similar vehicles, and is especially concerned with the provision of a new and improved pole socket for use with manure spreaders and similar machines embodying individually mounted dirigible front wheels controlled by suitable connections operated from the pole socket.

Heretofore, the pole receiving sockets of manure spreaders and similar implements have embodied a channel-like member connected in draft transmitting relation to the front axle of the machine by a casting providing both a vertical and a horizontal pivot, the pole being received by the channel member by means of a second horizontal pivot. It is occasionally necessary to back the spreader and it sometimes occurred under adverse conditions that the strains in backing caused the pole socket to jack-knife, sometimes causing the collapse of the pole socket.

The principal object of the present invention is the provision of a new and improved pole socket which not only can be manufactured at a lower cost than prior constructions but which is also stronger and in which all danger of jack-knifing and collapsing is eliminated. More specifically, it is an object of the present invention to provide a pole socket and associated parts so constructed and arranged that only one horizontal pivot is necessary and in which by the use of certain reinforcing all strains in backing, turning or pulling the machine forwardly are accommodated. One particular means by which these objects are attained embodies a pole socket having a box or girder-like rear section pivotally connected to the spreader axle for movement about a vertical axis only, thereby eliminating one of the horizontal axes mentioned above, and in which the forward end thereof is especially constructed to receive the spreader pole for movement about a horizontal axis and which is suitably reinforced at this point and also at the point where the steering connection for the dirigible wheels is made.

These and other objects and advantages of the present invention will be apparent to those skilled in the art after a consideration of the following detailed description of the preferred construction, taken in conjunction with the accompanying drawing illustrating the same.

In the drawing:

Figure 1 is a top plan view of a portion of a manure spreader embodying the principles of the present invention;

Figure 2 is an enlarged section taken along the line 2—2 of Figure 1; and

Figures 3 and 4 are sections taken, respectively, along the lines 3—3 and 4—4 of Figure 2.

Referring now to the drawing, more particularly to Figure 1, the manure spreader chosen to illustrate the principles of the present invention embodies a front axle or bolster 1, preferably formed of a pair of angles 2 and 3 arranged as a box girder, as indicated in Figure 2, and individually pivoted front dirigible wheels 4. The ends of the front axle or bolster 1 carry bolster heads 7 which receive the vertical journal sections of the steering spindles upon which the front wheels 4 are journaled. The spindles 8 are provided with generally forwardly extending steering arms 9 which have their outer ends apertured to receive the laterally outer ends of steering links 11. The inner ends of the steering links 11 are provided with adjustable sleeves 12 having flattened and apertured eyes 13 by which the steering links 11 are pivotally connected to the pole socket, indicated in its entirety by the reference numeral 15. The rear end of the pole socket 15 is pivotally connected for generally horizontal swinging about a vertical axis by means of a bolt 16 passing through the rear end of the socket 15 and received by upper and lower clips 17 and 18 (Figure 2) securely fastened, as by welding, to the angles 2 and 3 constituting the front axle or bolster 1.

The pole socket 15 is preferably formed of a pressed steel member of channel-like section (Figures 3 and 4) having an intermediate or base section 20 and side flanges 21 and 22. The side flanges 21 and 22 extend upwardly from the base portion 20 a somewhat greater distance at their forward ends than at their rear ends, and at the rear end of the pole socket 15 a reinforcing plate 25 is disposed in between the side flanges 21 and 22 and is extended forwardly about half the length of the pole socket and is then bent downwardly, as at 26, and has a forward end 27 formed to lie closely against the upper surface of the base section 20, as best shown in Figure 2. The upper portion of the reinforcing member 25 extending along the edges of the side flanges 21 and 22 is welded to the latter, as at 30 and 31, and similarly, the downwardly bent section 26 is welded to the side flanges 21 and 22 at 32. Likewise, the forwardmost end portion 27 of the reinforcing member is welded at 33 to the base section 20. By virtue of this construction, a girder or box-like construction is provided.

The rear end sections of the socket base 20 and the reinforcing plate 25 are apertured and receive a vertical sleeve 36, preferably welded to the pole socket 15 at one or more points, such as 37 (Figure 4). The sleeve 36 receives a bushing 38 through which the bolt 16 is disposed, as best shown in Figures 2 and 4, and a nut 39 serves when tightened to clamp the bushing in position between the plates 17 and 18. A cotter key 40 is provided to prevent the nut 39 from becoming detached. It is to be noted, especially from Figure 4, that the firm attachment of the sleeve 36 to the base portion 20 of the pole socket 15 and to the reinforcing plate 25 provides a very sturdy and rigid construction, the pole socket 15 being limited in its movement to a lateral swinging about the axis of the bolt 16. The connection of the steering links 11 with the pole socket 15 is also reinforced, and to this end, the portion 27 of the reinforcing plate 25 which lies against the base 20 is apertured to receive a bolt 45, the bolt 45 receiving a flanged bushing 46 over which the eyes 13 of the adjusting sleeves 12 are placed, and a square nut 47 is threaded onto the lower end of the bolt 45 and against a steel washer 48 for the purpose of holding the inner ends of the steering links 11 in position. The nut 47 is, in turn, held in place by a special holding nut 50 also threaded onto the lower end of the bolt 45 into locking engagement with the nut 47. It is to be noted, particularly from Figure 2, that the forward portion of the reinforcing plate 25 serves to strengthen and reinforce the connection between the pole socket proper and the steering links 11.

The pole tongue is indicated by the reference numeral 60 and comprises a member pivotally mounted for movement about a horizontal axis defined by a pivot bolt 61 carried in the forward portions of the pole socket sides 21 and 22. This portion of the pole socket is reinforced by an inverted U-shaped member 63 having sides 64 and 65 welded, as at 66, to the side flanges 21 and 22 at points adjacent the pivot 61 and also adjacent the forward edges of the side flanges 21 and 22, as best indicated in Figure 2. The member 63 also serves as a stop to limit the upward swinging of the pole or tongue 60 relative to the pole socket 15, the pole 60 being cut away, as at 68, at the rear end to clear the head of the bolt 45. Contact of the pole 60 with the forward end of the base 20 limits the downward swinging of the pole or tongue 60, and contact with the forward edge of the U-shaped stop 63 limits the upward swinging of the pole. It is to be observed that the member 63, in addition to serving as a stop for the pole 60, serves as a reinforcing member to strengthen the forward end of the pole socket, the sides 64 and 65 of the member 63 being disposed and secured to the pole socket both fore and aft of the pivot 61. It is also to be observed that the reinforcing plate member 25 extends from the rear end of the pole socket forwardly along the upper ends of the flanges 21 and 22 to a point adjacent the rear end of the pole 60. Here the plate member 25 is bent downwardly, as at 26, and has its forward end disposed underneath the rear end of the pole 60 and secured to the bottom 20 of the pole socket at this point by the pivot member 45. By virtue of these reinforcing members, the pole construction is very rigid and sturdy and is enabled to withstand the rough usage and stresses incident in the operation of vehicles and machines such as manure spreaders. The pole socket proper is limited in its movement to a swinging motion about a vertical pivot, defined by the bolt 16, and this arrangement is especially advantageous in that by connecting the steering links 11 to the horizontally swinging pole socket, the steering position of the wheels will not be affected by any vertical swinging of the pole or tongue, since such vertical motion is not imparted to the pole socket itself.

While I have shown and described above the preferred structure in which the principles of the present invention have been embodied, it is to be understood that my invention is not to be limited to the specific details shown and described above but that, in fact, widely different means may be employed in the practice of the broader aspects of my invention.

What I claim, therefore, and desire to secure by Letters Patent is:

1. In a vehicle of the horse-drawn type having a fixed front axle and dirigible wheels pivoted to the ends of the latter, a pole socket construction comprising a channel-like pole socket including a base section and upstanding flanges, a reinforcing member secured to the upper edges of said flanges at the rear end of said pole socket and extending forwardly and downwardly to a point of connection with said base section, pivot means adapted to connect the rear end of said pole socket to said axle, said pivot means restraining all movement of the pole socket relative to said axle except a horizontal swinging about a vertical axis, link means connecting said wheels with the portion of said socket base portion that is reinforced by the downwardly and forwardly disposed portion of said reinforcing member, and a pole secured for vertical swinging between the flanges of said pole socket forward of said reinforcing member.

2. In a vehicle having an axle and dirigible wheels pivoted thereto, the combination of a channel-like pole socket pivoted to said axle for movement relative thereto about a vertical axis, steering links pivoted to the pole socket, a reinforcing member carried by the flanges of said channel-like pole socket and extending longitudinally of the latter from its pivotal connection with said axle to its pivotal connection with said steering links, and a pole pivoted for movement about a horizontal axis to the outer portion of said pole socket forward of said reinforcing member.

3. In a vehicle of the horse-drawn type having a fixed front axle and dirigible wheels pivoted to the ends of the latter, a pole socket construction comprising a channel-like pole socket member including a base section and upstanding flanges, a reinforcing member secured to the upper edges of said flanges at the rear end of said pole socket member and extending forwardly and downwardly to a point of connection with said base section, pivot means connecting the rear end of said pole socket member with said axle and restraining all movement of the pole socket member relative to said axle except a horizontal swinging about a vertical axis, link means connecting said wheels with the portion of said socket base portion that is reinforced by the downwardly and forwardly disposed portion of said reinforcing member, a horizontal pivot for said pole carried by said flanges, and an inverted U-shaped member embracing said pole and secured to said flanges at points on opposite sides of said pole pivot.

4. A pole socket comprising a channel-like member having side flanges, a pole pivot carried at one end of said channel-like member, and a reinforcing member spaced from said pole pivot longitudinally of the pole socket and cooperating with said flanges to form a box-like section at the other end of the socket.

5. A pole socket comprising a channel-like member having side flanges, a reinforcing member cooperating with the latter to form a box-like section at one end of the socket, and a spindle receiving means carried by said box-like section and secured at its ends thereto.

6. A pole socket comprising a channel-like member having side flanges, a reinforcing member cooperating with the latter to form a box-like section at one end of the socket, said reinforcing member terminating short of the other end of the socket, and pole receiving means carried by the flanges at the other end of said socket.

7. A pole socket comprising a channel-like member having side flanges, a reinforcing member cooperating with the latter to form a box-like section at one end of the socket, a spindle receiving means carried by said box-like section and secured at its ends thereto, and a pole pivot secured to the flanges of said socket adjacent the other end of the latter and disposed at substantially right angles relative to the axis of said spindle receiving means.

8. A pole socket comprising a member U-shaped in cross section and a reinforcing member secured to the edges of said member adjacent one end and including a bent portion extending toward and secured to the intermediate section of said U-shaped member.

9. A vehicle pole construction comprising a channel-like pole socket having side flanges, a reinforcing member cooperating with the latter to form a box-like section at one end of the socket and including a bent portion extending toward and secured to the intermediate section of said channel-like member, a pole-receiving pivot carried by said flanges, and a pole mounted on said pivot and in a position between said flanges and adjacent the forward downwardly bent end of said reinforcing member.

10. A vehicle pole construction comprising a rigid channel-like pole socket, a vertical spindle receiving sleeve carried at one end of said socket, a reinforcing member connecting one end of said sleeve with the flanges of said channel-like socket, a transverse pivot secured to the flanges of said socket at the other end opposite said sleeve, a pole mounted on said transverse pivot, and a U-shaped stop disposed over said pole and secured to the flanges of said socket from a point adjacent said other end of the latter to a point on the opposite side of said transverse pivot, thereby reinforcing the socket adjacent the latter.

11. A vehicle pole construction comprising a rigid channel-like pole socket open at its upper side, a pole pivotally mounted between the flanges at the forward end of said socket, and a reinforcing plate secured to the upper edges of the flanges at the rear end of the socket so as to form a box-like section rearwardly of the pole.

12. A vehicle pole construction comprising a rigid channel-like pole socket open at its upper side, a pole pivotally mounted between the flanges at the forward end of said socket, and a reinforcing plate secured to the upper edges of the flanges at the rear end of the socket so as to form a box-like section rearwardly of the pole, and having a downwardly extending forward end secured to the flanges at the rear end of said pole.

13. A vehicle pole construction comprising a rigid channel-like pole socket open at its upper side, a pole pivotally mounted between the flanges at the forward end of said socket, and a reinforcing plate secured to the upper edges of the flanges at the rear end of the socket so as to form a box-like section rearwardly of the pole, and having a downwardly extending forward end secured to the flanges at the rear end of said pole terminating in a section disposed against the bottom of said socket to reinforce the latter at a point substantially underneath the rear end of the pole.

14. A vehicle pole construction comprising a rigid channel-like pole socket open at its upper side, a pole pivotally mounted between the flanges at the forward end of said socket, a reinforcing plate secured to the upper edges of the flanges at the rear end of the socket so as to form a box-like section rearwardly of the pole, and having a downwardly extending forward end secured to the flanges at the rear end of said pole terminating in a section disposed against the bottom of said socket to reinforce the latter at a point substantially underneath the rear end of the pole, and a pivot member carried by said socket and said plate section at said point.

15. A vehicle pole construction comprising a rigid channel-like pole socket open at its upper side, a pole pivotally mounted between the flanges at the forward end of said socket, pivot means for the pole carried by said flanges adjacent the forward end of said socket, a reinforcing plate secured to the upper edges of the flanges at the rear end of the socket so as to form a box-like section rearwardly of the pole, and an inverted U-shaped member disposed over said pole and secured at its ends to said side flanges both fore and aft of said pivot means so as to reinforce the latter.

16. A pole socket comprising a channel-like member having side flanges, a pole pivot carried at one end of said member, a reinforcing member spaced from said pole pivot longitudinally of the pole socket and cooperating with said flanges to form a box-like section at the other end of the socket, and a socket pivot connected with and supported at opposite ends by said box-like section.

17. In a vehicle having an axle and dirigible wheels pivoted thereto, the combination of a channel-like pole socket having side flanges, a reinforcing member cooperating with the latter to form a box-like section at one end of the channel-like member and including a bent portion extending toward and secured to the intermediate portion of the channel-like member at the other end thereof, a spindle receiving means carried by said box-like section and secured at its ends thereto, and a steering pivot secured to said extended portion of the reinforcing member and the adjacent portion of the channel-like member.

18. A pole socket comprising a member U-shaped in cross section, a reinforcing member secured to the edges of said member adjacent one end to form a box-like section at one end of the socket, a spindle receiving means carried by said box-like section and secured at its ends thereto, and a pole-receiving pivot carried by said U-shaped member forward of said reinforcing member.

LEONARD B. NEIGHBOUR.